(12) United States Patent
Miyoshi

(10) Patent No.: US 10,063,090 B2
(45) Date of Patent: Aug. 28, 2018

(54) SOLAR POWER GENERATION DEVICE AND CONTROL METHOD OF SOLAR POWER GENERATION DEVICE

(71) Applicant: TOYOTA JIDOSHA KABUSHIKI KAISHA, Toyota-shi (JP)

(72) Inventor: Tatsuya Miyoshi, Nisshin (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 105 days.

(21) Appl. No.: 15/027,095

(22) PCT Filed: Oct. 22, 2014

(86) PCT No.: PCT/IB2014/002189
§ 371 (c)(1),
(2) Date: Apr. 4, 2016

(87) PCT Pub. No.: WO2015/059548
PCT Pub. Date: Apr. 30, 2015

(65) Prior Publication Data
US 2016/0241078 A1   Aug. 18, 2016

(30) Foreign Application Priority Data
Oct. 22, 2013 (JP) ................... 2013-219572

(51) Int. Cl.
*H02J 7/00* (2006.01)
*H01M 10/44* (2006.01)
(Continued)

(52) U.S. Cl.
CPC .............. *H02J 7/35* (2013.01); *G05F 1/67* (2013.01); *H02J 7/007* (2013.01); *H02J 7/0029* (2013.01);
(Continued)

(58) Field of Classification Search
CPC .......... H02J 7/35; H02J 7/0029; H02J 7/0052; H02J 7/007; H02J 2007/0037;
(Continued)

(56) References Cited

U.S. PATENT DOCUMENTS

| 7,991,511 B2* | 8/2011 | Zhang | G05F 1/67 |
| | | | 136/244 |
| 8,461,809 B2* | 6/2013 | Rodriguez | H02M 7/4807 |
| | | | 323/207 |

(Continued)

FOREIGN PATENT DOCUMENTS

| JP | 57-193977 A | 11/1982 |
| JP | 6-266456 A | 9/1994 |

(Continued)

OTHER PUBLICATIONS

International Search Report dated Jan. 27, 2015 in PCT/IB2014/002189 filed Oct. 22, 2014.

(Continued)

*Primary Examiner* — Nha Nguyen
(74) *Attorney, Agent, or Firm* — Oblon, McClelland, Maier & Neustadt, L.L.P.

(57) ABSTRACT

A solar power generation device is provided which includes a first DC-DC converter to which an output of a solar battery is input, a storage battery to which an output of the first DC-DC converter is input, a second DC-DC converter that converts a voltage of the storage battery, and a control unit. The control unit changes a duty ratio of the first DC-DC converter so as not to charge the storage battery and changes a duty ratio of the second DC-DC converter so as to set an operating point of the solar battery to a maximum power point, when a value indicating a state of charge of the storage battery is equal to or greater than a predetermined value.

8 Claims, 3 Drawing Sheets

(51) Int. Cl.
  *H01M 10/46*   (2006.01)
  *H02J 7/35*    (2006.01)
  *G05F 1/67*    (2006.01)
  *H02S 40/38*   (2014.01)

(52) U.S. Cl.
  CPC ............ *H02J 7/0052* (2013.01); *H02S 40/38* (2014.12); *H02J 2007/0037* (2013.01); *H02J 2007/0059* (2013.01); *Y02E 10/58* (2013.01)

(58) Field of Classification Search
  CPC .... H02J 2007/0059; H02S 40/38; G05F 1/67; Y02E 10/58
  See application file for complete search history.

(56) References Cited

U.S. PATENT DOCUMENTS

| | | | | |
|---|---|---|---|---|
| 8,472,220 | B2* | 6/2013 | Garrity | H02M 7/4807 307/45 |
| 8,493,020 | B2* | 7/2013 | Lee | H01M 10/465 307/66 |
| 8,674,668 | B2* | 3/2014 | Chisenga | H02M 3/156 323/266 |
| 8,908,404 | B2* | 12/2014 | Itako | G05F 1/67 323/285 |
| 9,000,748 | B2* | 4/2015 | Huang | G05F 1/67 323/283 |
| 9,077,206 | B2* | 7/2015 | Zhang | H02J 3/383 |
| 9,225,199 | B2* | 12/2015 | Teggatz | H02J 7/35 |
| 9,231,476 | B2* | 1/2016 | Diewald | H02M 3/1582 |
| 2008/0150484 | A1* | 6/2008 | Kimball | H02J 7/34 320/125 |
| 2009/0284240 | A1* | 11/2009 | Zhang | G05F 1/67 323/285 |
| 2010/0207455 | A1* | 8/2010 | Erickson, Jr. | G05F 1/67 307/82 |
| 2011/0134668 | A1* | 6/2011 | Cho | G05F 1/67 363/78 |
| 2012/0042588 | A1* | 2/2012 | Erickson, Jr. | H01L 31/02021 52/173.3 |
| 2012/0047386 | A1* | 2/2012 | Matsui | H01M 10/465 713/340 |
| 2012/0223679 | A1* | 9/2012 | Iwai | H01M 10/465 320/128 |
| 2012/0256483 | A1* | 10/2012 | Nakashima | H01M 10/44 307/19 |
| 2013/0257152 | A1* | 10/2013 | Matsui | H01M 10/44 307/22 |
| 2013/0328397 | A1* | 12/2013 | Lee | H02J 3/32 307/23 |
| 2014/0253014 | A1* | 9/2014 | Nishikawa | H02J 7/35 320/101 |
| 2015/0270731 | A1* | 9/2015 | Adelmann | H02J 7/35 320/101 |
| 2015/0280487 | A1* | 10/2015 | Nakazawa | H01M 10/44 320/101 |
| 2016/0254673 | A1* | 9/2016 | Batten | G05F 1/67 307/112 |
| 2016/0268806 | A1* | 9/2016 | Chatterjee | H02M 3/1584 |
| 2017/0070085 | A1* | 3/2017 | Cher | H02J 7/04 |

FOREIGN PATENT DOCUMENTS

| | | |
|---|---|---|
| JP | 6-324752 A | 11/1994 |
| JP | 2003-67065 A | 3/2003 |
| JP | 2010-206912 A | 9/2010 |

OTHER PUBLICATIONS

Partial English translation of Office Action dated Aug. 11, 2015 in JP 2013-219572 filed Oct. 22, 2013 (2 pages).

* cited by examiner

SOLAR POWER GENERATION DEVICE AND CONTROL METHOD OF SOLAR POWER GENERATION DEVICE

BACKGROUND OF THE INVENTION

1. Field of the Invention

The present invention relates to a solar power generation device and a control method of a solar power generation device.

2. Description of Related Art

A technique of controlling a duty ratio of a converter so as to track a maximum power point of a solar battery and controlling the duty ratio of the converter so as to shift an operating point of the solar battery from the maximum power point to an open-circuit voltage side when a storage battery approaches a fully-charged state is known (for example, see Japanese Patent Application Publication No. 6-324752 (JP 6-324752 A)).

However, in the above-mentioned related art, when the storage battery approaches a fully-charged state, the operating point of the solar battery is shifted from the maximum power point and thus the solar battery cannot be operated at the maximum power point.

SUMMARY OF THE INVENTION

Therefore, an aspect of the invention provides a solar power generation device that can adjust an operating point of a solar battery to a maximum power point even when a value indicating a state of charge of a storage battery is equal to or greater than a predetermined value.

According to an aspect of the invention, there is provided a solar power generation device including: a first DC-DC converter to which an output of a solar battery is input; a storage battery to which an output of the first DC-DC converter is input; a second DC-DC converter that converts a voltage of the storage battery; and a control unit that changes a duty ratio of the first DC-DC converter so as not to charge the storage battery and changes a duty ratio of the second DC-DC converter so as to set an operating point of the solar battery to a maximum power point when a value indicating a state of charge of the storage battery is equal to or greater than a predetermined value.

According to the aspect of the invention, it is possible to provide a solar power generation device that can adjust an operating point of a solar battery to a maximum power point even when a value indicating a state of charge of a storage battery is equal to or greater than a predetermined value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings. In the below description and the drawings, elements having substantially the same functional configurations will be referenced by the same reference signs and description thereof will not be repeated.

Configuration of Solar Power Generation Device 1

The configuration of a solar power generation device 1 according to an embodiment of the invention will be described below with reference to FIG. 1.

Figure 1:
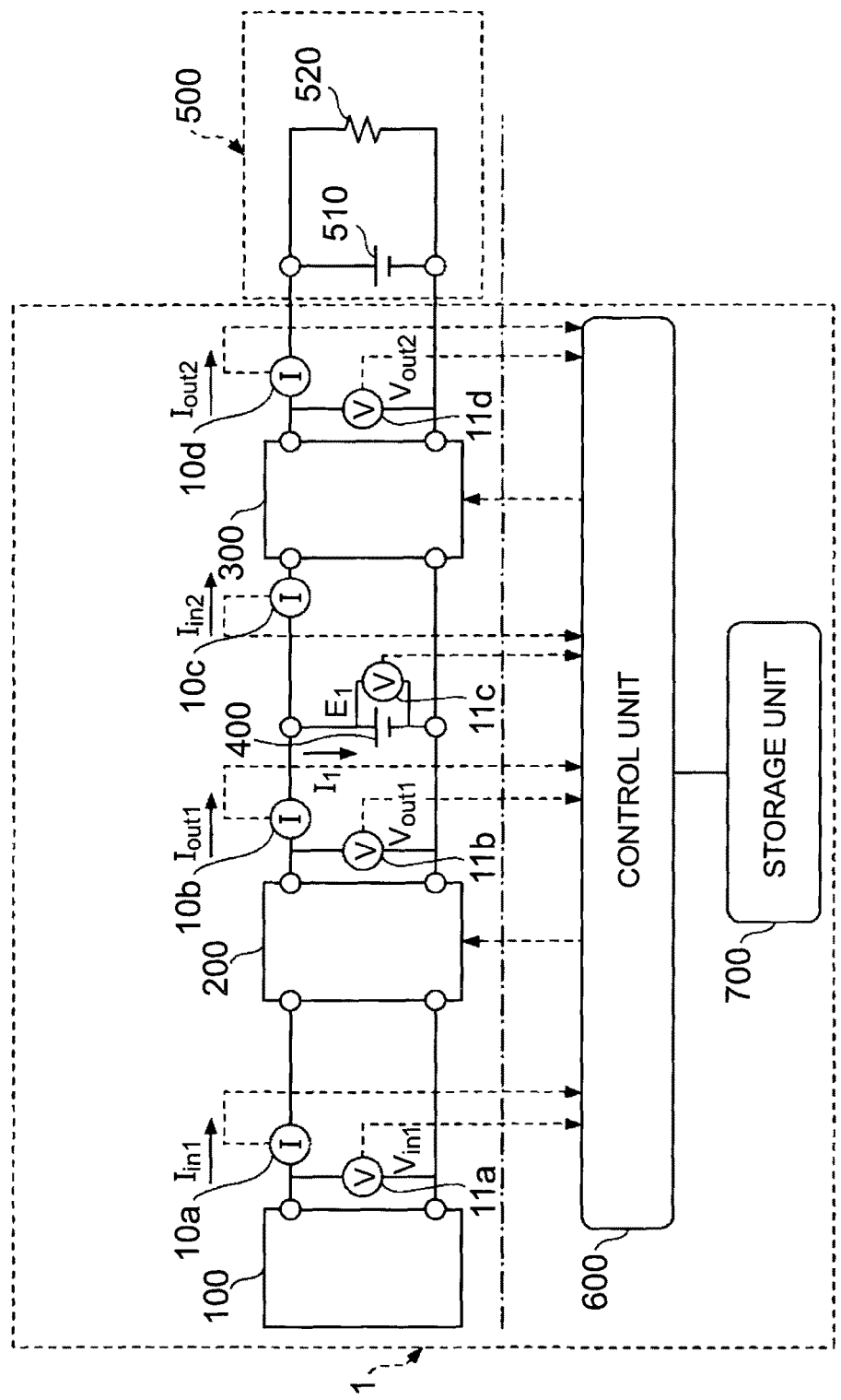
FIG. 1 is a block diagram illustrating a configuration of a solar power generation device according to an embodiment of the invention.

As illustrated in FIG. 1, the solar power generation device 1 includes a solar battery 100, a first DC-DC converter 200, a second DC-DC converter 300, a storage battery 400, a control unit 600, and a storage unit 700.

The solar power generation device 1 also includes current detectors 10a, 10b, 10c, and 10d and voltage detectors 11a, 11b, 11c, and 11d for measuring currents and voltages of parts of a circuit. For example, a current sensor or an ammeter can be used as the current detectors 10a, 10b, 10c, and 10d. For example, a voltage sensor or a voltmeter can be used as the voltage detectors 11a, 11b, 11c, and 11d.

A power consumption section 500 including an auxiliary storage battery 510 and a load 520 is connected to an output end of the solar power generation device 1.

In FIG. 1, $V_{in1}$ denotes an output voltage of the solar battery 100 or an input voltage of the first DC-DC converter 200. $I_{in1}$ denotes an output current of the solar battery 100 or an input current of the first DC-DC converter 200. $V_{out1}$ and $I_{out1}$ denote an output voltage and an output current of the first DC-DC converter 200, respectively. $I_{in2}$ denotes an input current of the second DC-DC converter 300. $V_{out2}$ and $I_{out2}$ denote an output voltage and an output current of the second DC-DC converter 300, respectively. $E_1$ denotes the voltage of the storage battery 400.

The solar battery 100 is a semiconductor device that is irradiated with light such as sunlight and that converts the optical energy into electric energy. The type thereof is not limited and, for example, a solar battery module, a solar battery panel, and a solar battery array can be used.

The first DC-DC converter 200 is a DC voltage converter that steps up and down the output voltage $V_{in1}$ of the solar battery 100, and is disposed in series between the solar battery 100 and the storage battery 400.

The first DC-DC converter 200 has two driving modes of a maximum power point tracking (MPPT) mode and a constant voltage output mode. The MPPT mode is a mode in which the first DC-DC converter 200 is driven so that the operating point of the solar battery 100 is a maximum power point (MPP). The constant voltage output mode is a mode in which the first DC-DC converter 200 is driven so that a constant voltage is output with respect to the varying output voltage $V_{in1}$ of the solar battery 100.

As the driving mode of the first DC-DC converter 200, the MPPT mode or the constant voltage output mode is selected in response to a command from the control unit 600 to be described later.

The second DC-DC converter 300 is a DC voltage converter that steps up and down the output voltage of the first DC-DC converter 200 or the storage battery 400, and is disposed in series between the storage battery 400 and the power consumption section 500.

The second DC-DC converter 300 has two driving modes of the MPPT mode and the constant voltage output mode. The MPPT mode is a mode in which the second DC-DC converter 300 is driven so that the operating point of the solar battery 100 is a maximum power point (MPP). The constant voltage output mode is a mode in which the second DC-DC converter 300 is driven so that a constant voltage is output with respect to the varying output voltage of the first DC-DC converter 200 or the storage battery 400.

As the driving mode of the second DC-DC converter 300, the MPPT mode or the constant voltage output mode is selected in response to a command from the control unit 600 to be described later.

The storage battery 400 stores (accumulates) power generated by the solar battery 100 and supplies the power to the power consumption section 500 by discharge if necessary. The type of the storage battery 400 is not particularly limited and a battery such as a lead storage battery, an NaS battery, a nickel-hydrogen battery, and a lithium-ion battery or a capacitor such as a lithium-ion capacitor and an electrical double-layer capacitor can be used.

The control unit 600 includes, for example, a microcomputer, acquires the currents measured by the current detectors and the voltages measured by the voltage detectors, and stores the acquired currents and voltages in the storage unit 700. The control unit 600 performs computations using the acquired currents and voltages and stores the computation results in the storage unit 700.

The control unit 600 monitors the state of charge of the storage battery 400 on the basis of the acquired currents and voltages and the control unit 600 selects the driving modes of the first DC-DC converter 200 and the second DC-DC converter 300 depending on the state of charge of the storage battery 400.

The storage unit 700 stores a predetermined threshold voltage $E_{th}$ of the storage battery 400 and the currents, the voltage, and the computed values acquired by the control unit 600. The storage unit 700 can employ, for example, a semiconductor memory, a magnetic disk, or an optical disc.

The power consumption section 500 includes, for example, an auxiliary storage battery 510 and a load 520.

The auxiliary storage battery 510 stores power output from the second DC-DC converter 300 of the solar power generation device 1 and supplies power to the load 520 by discharge if necessary.

The load 520 is a unit that consumes the power output from the second DC-DC converter 300 of the solar power generation device 1 and the power supplied from the auxiliary storage battery 510. The load 520 can employ, for example, a DC-driven device, an inverter for converting DC into AC, or an AC-driven device operating with AC power.

Operation of Solar Power Generation Device 1

The operation of the solar power generation device 1 will be described below with reference to FIGS. 1 to 4.

Figure 2:
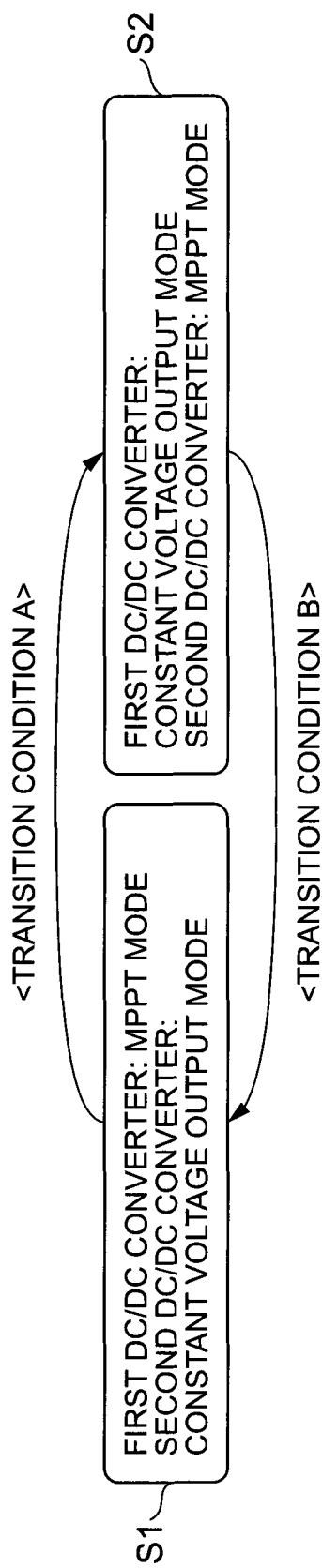
FIG. 2 is a diagram schematically illustrating a control method of a solar power generation device according to an embodiment of the invention.

FIG. 2 is a diagram schematically illustrating a control method of the solar power generation device 1 according to the embodiment.

The control method of the solar power generation device 1 according to this embodiment includes a step of monitoring the state of charge of the storage battery 400, a step of changing the duty ratio of the first DC-DC converter 200 so as to shift the operating point of the solar battery 100 from the maximum power point, that is, performing control so as not to charge the storage battery 400, and changing the duty ratio of the second DC-DC converter 300 so as to set the operating point of the solar battery 100 to the maximum power point, when a value indicating the state of charge of the storage battery 400 is equal to or greater than a predetermined value, and a step of changing the duty ratio of the first DC-DC converter 200 so as to set the operating point of the solar battery 100 to the maximum power point, when the value indicating the state of charge of the storage battery 400 is less than the predetermined value.

As illustrated in FIG. 2, the control unit 600 monitors the state of charge of the storage battery 400 and switches the driving modes of the first DC-DC converter 200 and the second DC-DC converter 300 depending on the state of charge of the storage battery 400.

When the value, indicating the state of charge of the storage battery 400 is equal to or greater than a predetermined value (transition condition A), the control unit 600 changes the duty ratio $D_1$ of the first DC-DC converter 200 so as to shift the operating point of the solar battery 100 from the MPP, thereby performing control so as not to charge the storage battery 400 (constant voltage output mode).

At the same time, the control unit 600 changes the duty ratio $D_2$ of the second DC-DC converter 300 so as to set the operating point of the solar battery 100 to the MPP (MPPT mode).

The predetermined state of charge can be arbitrarily set by a user and may be, for example, a fully-charged state or a partially-charged state of about 80%.

On the other hand, when the value indicating the state of charge of the storage battery 400 is less than the predetermined value (transition condition B), the control unit 600 changes the duty ratio $D_1$ of the first DC-DC converter 200 so as to set the operating point of the solar battery 100 to the MPP (MPPT mode).

At the same time, the control unit 600 changes the duty ratio $D_2$ of the second DC-DC converter 300 so as to supply power of a constant voltage to the load 520 side and to charge the storage battery 400 with surplus power (constant voltage output mode).

The operation of the solar power generation device 1 will be described below in detail with reference to FIG. 1.

First, the control unit 600 acquires the voltage $E_1$ of the storage battery 400 measured by the voltage detector 11c and stores the acquired voltage in the storage unit 700. The control unit 600 compares the voltage $E_1$ of the storage battery 400 with the threshold voltage $E_{th}$ stored in advance in the storage unit 700, performs control of a first state S1 when $E_1 < E_{th}$ (less than the threshold voltage) is established, and performs control of a second state S2 when $E_1 \geq E_{th}$ (equal to or greater than the threshold voltage) is established.

The first state S1 and the second state S2 may be repeatedly selected depending on the state of charge of the storage battery 400.

For example, the duty ratio of the first DC-DC converter 200 may be changed to shift the operating point of the solar battery 100 from the maximum power point, that is, not to charge the storage battery 400, the duty ratio of the second DC-DC converter 300 may be changed to set the operating point of the solar battery 100 to the maximum power point, and then the duty ratio of the first DC-DC converter 200 may be changed to set the operating point of the solar battery 100 to the maximum power point when the value indicating the state of charge of the storage battery 400 is less than the predetermined value.

The threshold value $E_{th}$ can be arbitrarily set by a user. The threshold value $E_{th}$ is preferably set to be lower than the fully-charged voltage $E_{max}$ of the storage battery 400. Accordingly, the storage battery 400 is controlled so as not to exceed the fully-charged state (so that the voltage $E_1$ is not greater than the fully-charged voltage $E_{max}$) and is protected from an overcharged state.

First State S1

First, the control unit 600 acquires the voltage $V_{in1a}$ measured by the voltage detector 11a and the current $I_{in1a}$ measured by the current detector 10a and stores the acquired voltage and current in the storage unit 700.

Then, the control unit 600 multiplies the voltage $V_{in1a}$ by the current $I_{in1a}$ to calculate power $P_{in1a}$ and stores the calculated power in the storage unit 700.

Then, the control unit 600 drives the first DC-DC converter 200 so as to reach a voltage $V_{in1b}$ which is greater by a predetermined value $\Delta V$ than the voltage $V_{in1a}$, performs measuring of the current $I_{in1b}$ and calculating of power $P_{in1b}$, and stores the acquired values in the storage unit 700.

Then, the control unit 600 compares the power $P_{in1a}$ and the power $P_{in1b}$ and drives the first DC-DC converter 200 so as to reach a voltage $V_{in1c}$ which is greater by the predetermined value $\Delta V$ than the voltage $V_{in1b}$ when the power $P_{in1b}$ is greater than the power $P_{in1a}$.

On the other hand, when the power $P_{in1b}$ is less than the power $P_{in1a}$, the control unit 600 drives the first DC-DC converter 200 so as to set the voltage $V_{in1a}$ which is less by the predetermined value $\Delta V$ than the voltage $V_{in1b}$.

This series of operations are repeatedly performed by causing the control unit 600 to change the duty ratio $D_1$ of the first DC-DC converter 200, and the operating point of the solar battery 100 is set to the MPP.

The control unit 600 determines the duty ratio $D_2$ of the second DC-DC converter 300 so that the output voltage $V_{out2}$ of the second DC-DC converter 300 is a target voltage $V_{out}$ of the power consumption section 500 at the same time as controlling the first DC-DC converter 200.

First, the control unit 600 acquires the voltage $V_{out1}$ measured by the voltage detector 11b and stores the acquired voltage in the storage unit 700. The control unit 600 compares the voltage $V_{out1}$ with the target voltage $V_{out1}$ of the power consumption section 500 side stored in advance in the storage unit 700.

When the voltage $V_{out1}$ is less than the target voltage $V_{out1}$, the control unit 600 drives the second DC-DC converter 300 so that the voltage $V_{out1}$ is the target voltage $V_{out}$, and steps up the voltage $V_{out1}$. On the other hand, when the voltage $V_{out1}$ is greater than the target voltage $V_{out}$, the control unit 600 drives the second DC-DC converter 300 so that the voltage $V_{out1}$ is the target voltage $V_{out}$, and steps down the voltage $V_{out1}$.

The first DC-DC converter 200 and the second DC-DC converter 300 are not particularly limited and, for example, a step-down converter, a step-up converter, or a step-up-and-down converter can be used.

Figure 3:
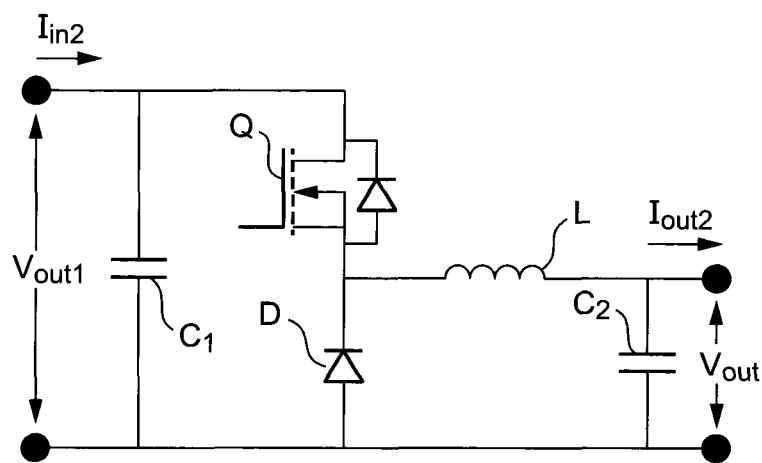
FIG. 3 is a circuit diagram illustrating an example of a DC-DC converter.

FIG. 3 is an example of a circuit diagram of a step-down converter, in which a switch Q is disposed in series with the input voltage $V_{out1}$. The input voltage $V_{out1}$ is connected to the output via a low-pass filter which includes the switch Q, an inductor L, and a capacitor $C_2$.

Figure 4:
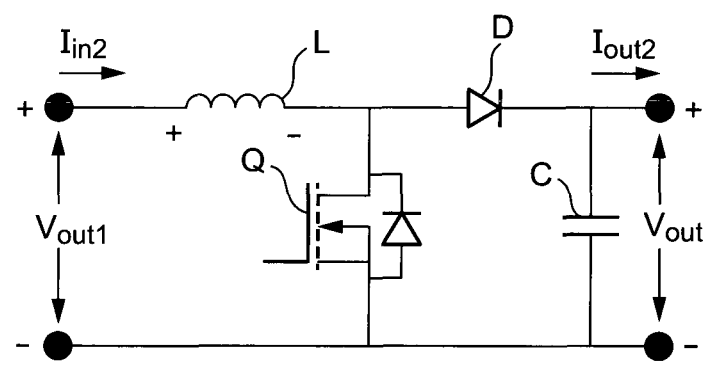
FIG. 4 is a circuit diagram illustrating another example of the DC-DC converter.

FIG. 4 is an example of a circuit diagram of a step-up converter, in which an inductor L is disposed in series with the input voltage $V_{out1}$. The input voltage $V_{out1}$ is connected to the output via the inductor L and a diode D.

For example, when the step-down converter illustrated in FIG. 3 is used as the second DC-DC converter 300, the control unit 600 can control the voltage $V_{out1}$ so as to be the target voltage $V_{out}$ by setting the duty ratio $D_2$ to $D_2 = V_{out}/V_{out1}$.

For example, when the step-up converter illustrated in FIG. 4 is used as the second DC-DC converter 300, the control unit 600 can control the voltage $V_{out1}$ so as to be the target voltage $V_{out}$ by setting the duty ratio $D_2$ to $D_2 = 1 - V_{out1}/V_{out}$.

The driving in the constant voltage output mode of the second DC-DC converter 300 is not limited to these examples, but can be arbitrarily determined depending on the type of the DC-DC converter selected by one skilled in the art.

Second State S2

A case in which the storage battery 400 is charged, the voltage $E_1$ of the storage battery 400 is equal to or greater than the threshold value $E_{th}$ ($E_1 \geq E_{th}$), and the value indicating the state of charge of the storage battery 400 is equal to or greater than a predetermined value will be described below.

First, the control unit 600 acquires the current $I_{out1}$ measured by the current detector 10b and the voltage $I_{in2}$ measured by the current detector 10c and stores the acquired currents in the storage unit 700. The control unit 600 calculates a charging current $I_1$ ($=I_{out1}-I_{in2}$) flowing in the storage battery 400 using the current $I_{out1}$ and the current $I_{in2}$.

Then, the control unit 600 controls the duty ratio $D_1$ of the first DC-DC converter 200 so as to output the voltage $V_{out1}$ at which the charging current $I_1$ is 0. Accordingly, it is possible to prevent the storage battery 400 from being charged above a predetermined state of charge. However, the control unit 600 cannot MPPT-control the solar battery 100 using the first DC-DC converter 200.

Accordingly, the control unit 600 acquires the voltage $V_{in1A}$ measured by the voltage detector 11a and the current $I_{in1A}$ measured by the current detector 10a and stores the acquired voltage and current in the storage unit 700.

Then, the control unit 600 multiplies the voltage $V_{in1A}$ by the current $I_{in1A}$ to calculate power $P_{in1A}$ and stores the calculated power in the storage unit 700.

Then, the control unit, 600 drives the second DC-DC converter 300 so as to reach a voltage $V_{in1B}$ which is greater by a predetermined value $\Delta V$ than the voltage $V_{in1A}$, performs measuring of the current $I_{in1B}$ and calculating of power $P_{in1B}$, and stores the acquired values in the storage unit 700.

Then, the control unit 600 compares the power $P_{in1A}$ and the power $P_{in1B}$ and drives the second DC-DC converter 300 so as to reach a voltage $V_{in1C}$ which is greater by the predetermined value $\Delta V$ than the voltage $V_{in1B}$ when the power $P_{in1B}$ is greater than the power $P_{in1A}$.

On the other hand, when the power $P_{in1B}$ is less than the power $P_{in1A}$, the control unit 600 drives the second DC-DC converter 300 so as to set the voltage $V_{in1A}$ which is less by the predetermined value $\Delta V$ than the voltage $V_{in1B}$.

This series of operations are repeatedly performed by causing the control unit 600 to change the duty ratio $D_2$ of the second DC-DC converter 300, and the operating point of the solar battery 100 is set to the MPP.

The control unit 600 acquires the charging current $I_1$ ($=I_{out1}-I_{in2}$) of the first DC-DC converter 200 at predetermined time intervals.

When the acquired charging current $I_1$ is greater than 0, the control unit 600 drives the first DC-DC converter 200 so as to set the output voltage $V_{out1}$ of the first DC-DC converter 200 to a voltage less by the predetermined value $\Delta V$ than the voltage $V_{out1}$.

On the other hand, when the acquired charging current $I_1$ is less than 0, the control unit 600 drives the first DC-DC converter 200 so as to set the output voltage $V_{out1}$ of the first DC-DC converter 200 to a voltage greater by the predetermined value $\Delta V$ than the voltage $V_{out1}$.

The control unit 600 controls the first DC-DC converter 200 at predetermined time intervals, thereby preventing the storage battery 400 from being charged above a predetermined state of charge.

This series of operations are performed by causing the control unit 600 to change the duty ratio $D_1$ of the first DC-DC converter 200.

The predetermined time intervals at which the control unit 600 acquires the charging current $I_1$ of the first DC-DC converter 200 are preferably synchronized with the time intervals at which the duty ratio $D_2$ of the second DC-DC converter 300 is changed.

The control unit 600 acquires the voltage $V_{out2}$ measured by the voltage detector 11d and the current $I_{out2}$ measured by the current detector 10d and stores the acquired voltage and current in the storage unit 700. The control unit 600 may acquire information on the voltage and the current supplied to the power consumption section 500 on the basis of the voltage $V_{out2}$ and the current $I_{out2}$ and may change the duty ratio $D_2$ of the second DC-DC converter 300 if necessary.

As described above, in the solar power generation device 1 and the control method of the solar power generation device 1 according to this embodiment, it is possible to adjust the operating point of the solar battery 100 to the MPP even when the value indicating the state of charge of the storage battery 400 is equal to or greater than the predetermined value.

While the solar power generation device 1 and the control method of the solar power generation device 1 have been described with reference to the embodiment, the invention is not limited to the embodiment and can be modified and improved in various forms without departing from the scope of the invention.

For example, a method of measuring the voltage $E_1$ of the storage battery 400 and comparing the voltage $E_1$ of the storage battery 400 with the threshold value $E_{th}$ has been described above as the method of causing the control unit 600 to determine the state of charge of the storage battery 400, but the invention is not limited to this method.

For example, the storage battery 400 may not be provided with a voltage detector, the internal resistance of the storage battery 400 may be calculated from the output voltage $V_{out1}$ and the charging current $I_1$ of the first DC-DC converter 200, and the voltage E1 of the storage battery 400 may be predicted from the internal resistance and the charging current $I_1$. For example, the output voltage $V_{out1}$ of the first DC-DC converter 200 may be used instead of the voltage $E_1$ of the storage battery 400.

A hill-climbing method has been used as the operation in the MPPT mode of the DC-DC converter, but the invention is not limited to this method. For example, an operation capable of tracking the MPP of the solar battery 100, such as an increment conductance method, may be used.

An example where a single second DC-DC converter 300 is disposed in series between the storage battery 400 and the power consumption section 500 has been described, but the number of second DC-DC converters 300 is not limited to one.

For example, plural second DC-DC converters 300 may be connected in parallel; and at least one of the second DC-DC converters 300 only has to be driven in the MPPT mode in the second state S2. In this case, plural loads 520 having different target voltages $V_{out}$ can be connected.

Similarly to the second DC-DC converter 300, the number of first DC-DC converters 200 is not limited to one. For example, plural first DC-DC converters 200 may be connected in parallel. In this case, plural solar batteries 100 having different output voltages can be connected to the first DC-DC converters 200, respectively.

The invention claimed is:

1. A solar power generation device comprising:
 a first DC-DC converter configured to receive an output of a semiconductor device that converts optical energy into electric energy;
 a storage battery configured to receive an output of the first DC-DC converter;
 a second DC-DC converter configured to convert a voltage of the storage battery; and
 a processor configured to:
 when a value indicating a state of charge of the storage battery is equal to or greater than a predetermined value:
 change a duty ratio of the first DC-DC converter so as not to charge the storage battery without interrupting the output of the semiconductor device to the first DC-DC converter, and
 change a duty ratio of the second DC-DC converter so as to set an operating point of the semiconductor device to a maximum power point of the semiconductor device.

2. The solar power generation device according to claim 1, wherein the processor is configured to perform control of outputting an output voltage of the first DC-DC converter so as not to charge the storage battery when the value indicating the state of charge of the storage battery is equal to or greater than the predetermined value.

3. The solar power generation device according to claim 2, wherein the processor is configured to determine whether the value indicating the state of charge of the storage battery is equal to or greater than the predetermined value by comparing a voltage of the storage battery with a threshold voltage.

4. The solar power generation device according to claim 2, wherein the processor is configured to determine that the value indicating the state of charge of the storage battery is equal to or greater than the predetermined value when a voltage of the storage battery is equal to or greater than a threshold voltage.

5. The solar power generation device according to claim 1, wherein the processor is configured to determine whether the value indicating the state of charge of the storage battery is equal to or greater than the predetermined value by comparing a voltage of the storage battery with a threshold voltage.

6. The solar power generation device according to claim 1, wherein the processor is configured to determine that the value indicating the state of charge of the storage battery is equal to or greater than the predetermined value when a voltage of the storage battery is equal to or greater than a threshold voltage.

7. A control method of a solar power generation device of performing control of shifting an operating point of a semiconductor device that converts optical energy into electric energy to a maximum power point, comprising:
 monitoring a state of charge of a storage battery that stores power generated by the semiconductor device;
 when a value indicating the state of charge of the storage battery is equal to or greater than a predetermined value:

changing a duty ratio of a first DC-DC converter configured to receive an output of the semiconductor device, so as not to charge the storage battery without interrupting the output of the semiconductor device to the first DC-DC converter, and changing a duty ratio of a second DC-DC converter configured to convert a voltage of the storage battery so as to set the operating point of the semiconductor device to the maximum power point; and when the value indicating the state of charge of the storage battery is less than the predetermined value:

changing the duty ratio of the first DC-DC converter so as to set the operating point of the semiconductor device to the maximum power point.

8. The control method of a solar power generation device according to claim 7, further comprising:

when the value indicating the state of charge of the storage battery is less than the predetermined value after the duty ratio of the first DC-DC converter is changed so as to not charge the storage battery and the duty ratio of the second DC-DC converter is changed so as to set the operating point of the solar battery to the maximum power point:

changing the duty ratio of the first DC-DC converter so as to set the operating point of the semiconductor device to the maximum power point.

\* \* \* \* \*